United States Patent
Ko et al.

(10) Patent No.: US 8,683,499 B2
(45) Date of Patent: Mar. 25, 2014

(54) DISC LOADING STRUCTURE AND OPTICAL DISC DRIVE EMPLOYING THE SAME

(75) Inventors: Joung-sug Ko, Seoul (KR); Sang-yun Baek, Seongnam-si (KR); Un-jin Choi, Suwon-si (KR); Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 4 days.

(21) Appl. No.: 13/469,970

(22) Filed: May 11, 2012

(65) Prior Publication Data
US 2013/0007780 A1    Jan. 3, 2013

(30) Foreign Application Priority Data

Jul. 1, 2011   (KR) .................. 10-2011-0065480

(51) Int. Cl.
 *G11B 17/043*    (2006.01)
(52) U.S. Cl.
 USPC ........................................ 720/620; 720/619
(58) Field of Classification Search
 USPC .................... 720/617, 619, 620, 622, 623
 See application file for complete search history.

(56) References Cited

U.S. PATENT DOCUMENTS

| | | | | |
|---|---|---|---|---|
| 8,255,935 B2* | 8/2012 | Miyata | | 720/623 |
| 2007/0107001 A1* | 5/2007 | Tsutsumi et al. | | 720/600 |
| 2008/0046900 A1* | 2/2008 | Jitsukawa et al. | | 720/620 |
| 2008/0134227 A1* | 6/2008 | Eguchi | | 720/703 |
| 2013/0047170 A1* | 2/2013 | Ko et al. | | 720/601 |

FOREIGN PATENT DOCUMENTS

| KR | 10-2007-0049982 | 5/2007 |
|---|---|---|
| KR | 10-2009-0113034 | 10/2009 |

* cited by examiner

*Primary Examiner* — Will J Klimowicz
(74) *Attorney, Agent, or Firm* — NSIP Law (57) ABSTRACT

A disc loading apparatus is provided. The disc loading apparatus includes a frame base, a spindle motor installed in the frame base, a disc guide wall disposed at one side of the frame base and configured to guide a loading of a disc, a disc loading structure disposed in front of another side of the frame base and disposed parallel to a direction in which the disc enters to load the disc on the spindle motor, a rotational disc centering lever disposed adjacent to the guide wall to center the disc with respect to the spindle motor, and an ejecting lever disposed at a rear side of the frame base and configured to unload the disc loaded on the spindle motor.

20 Claims, 10 Drawing Sheets

DISC LOADING STRUCTURE AND OPTICAL DISC DRIVE EMPLOYING THE SAME

CROSS-REFERENCE TO RELATED APPLICATION(S)

This application claims the benefit under 35 U.S.C. §119(a) of Korean Patent Application No. 10-2011-0065480 filed on Jul. 1, 2011, in the Korean Intellectual Property Office, the entire disclosure of which is incorporated herein by reference for all purposes.

BACKGROUND

1. Field

The following description relates to a disc loading structure and an optical disc drive employing the same.

2. Description of Related Art

A slot-in type optical disc drive is an optical disc drive that loads a disc without the aid of a tray. The slot-in type optical disc drive includes a disc loading structure having a complex structure. The complex structure includes a plurality of levers used to load the disc. It would be more beneficial for the disc loading structure to have a more stable and more economic structure for loading and unloading a disc. In other words, it would be beneficial for the disc loading apparatus to have a more stable structure, to be easier to assemble, and to have a smaller number of elements.

SUMMARY

According to an aspect, a disc loading apparatus is provided. The disc loading apparatus includes a frame base, a spindle motor installed in the frame base, a disc guide wall disposed at one side of the frame base and configured to guide a loading of a disc, a disc loading structure disposed in front of another side of the frame base and disposed parallel to a direction in which the disc enters to load the disc on the spindle motor, a rotational disc centering lever disposed adjacent to the guide wall and configured to center the disc with respect to the spindle motor, and an ejecting lever disposed at a rear side of the frame base and configured to unload the disc loaded on the spindle motor.

The disc guide wall may include a linear guide wall disposed parallel to a direction in which the disc enters and a curved guide wall corresponding to an edge of the disc.

The disc centering lever may be disposed between the linear guide wall and the curved guide wall.

The disc centering lever may include a rotating shaft coupled to the frame base and an operating wall capable of being attached to and detached from the edge of the disc.

The disc loading structure may include first and second loading levers configured to be interlocked with each other.

The second loading lever may include a loading member configured to contact the edge of the disc.

The first and second loading levers may be rotationally coupled to the frame base.

In another aspect, an optical disc drive is provided. The optical disc drive includes a frame base, a sub-frame rotationally disposed in a direction orthogonal to a plane of the frame base, a spindle motor installed in the sub-frame, an optical pick-up apparatus disposed at one side of the spindle motor on the sub-frame, a disc guide wall disposed at one side of the frame base and disposed parallel to a direction in which a disc enters, a disc loading structure disposed at another side of the frame base and disposed parallel to the direction in which the disc enters to load the disc on the spindle motor, a rotational disc centering lever disposed at a rear side of the guide wall and configured to center the disc with respect to the spindle motor, and an ejecting lever disposed at a rear side of the frame base and configured to unload the disc loaded on the spindle motor.

The disc guide wall may include a linear guide wall disposed parallel to a direction in which the disc enters and a curved guide wall corresponding to an edge of the disc.

The disc centering lever may be disposed between the linear guide wall and the curved guide wall.

The disc centering lever may include a rotating shaft coupled to the frame base and an operating wall capable of being attached to and detached from the edge of the disc.

The disc loading structure may include a loading motor, a first loading lever operating with respect to the loading motor, and a second loading lever capable of being interlocked with the first loading lever, a loading member that contacts the disc being disposed at an end of the second loading lever.

One end of the first loading lever may be coupled to a cam structure disposed between the rotating shaft of the second loading lever and the loading member.

In another aspect, an optical disc apparatus includes a frame base, a sub-frame rotationally disposed in a direction orthogonal to a plane of the frame base, a spindle motor installed in the sub-frame, an optical pick-up apparatus disposed at one side of the spindle motor on the sub-frame, a disc guide wall disposed at one side of the frame base, a disc loading structure disposed at another side of the frame base, a rotational disc centering lever disposed adjacent to the disc guide wall and configured to center a disc with respect to the spindle motor, an ejecting lever configured to unload the disc loaded on the spindle motor at a rear side of the frame base, a loading motor configured to operate the rotational disc centering lever and the ejecting lever, and an interlocking structure configured to transmit power supplied from the loading motor to the rotational disc centering lever and the ejecting lever.

The interlocking structure may include a gear apparatus connected to the loading motor, a main slider interlocked with the gear apparatus configured to operate the disc loading structure, and a sub-slider operated by the main slider and configured to operate the ejecting lever.

The disc guide wall may include a linear guide wall disposed parallel to a direction in which the disc enters and a curved guide wall corresponding to an edge of the disc.

The disc centering lever may be disposed between the linear guide wall and the curved guide wall.

The disc centering lever may include a rotating shaft coupled to the frame base and an operating wall capable of being attached to and detached from the edge of the disc.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
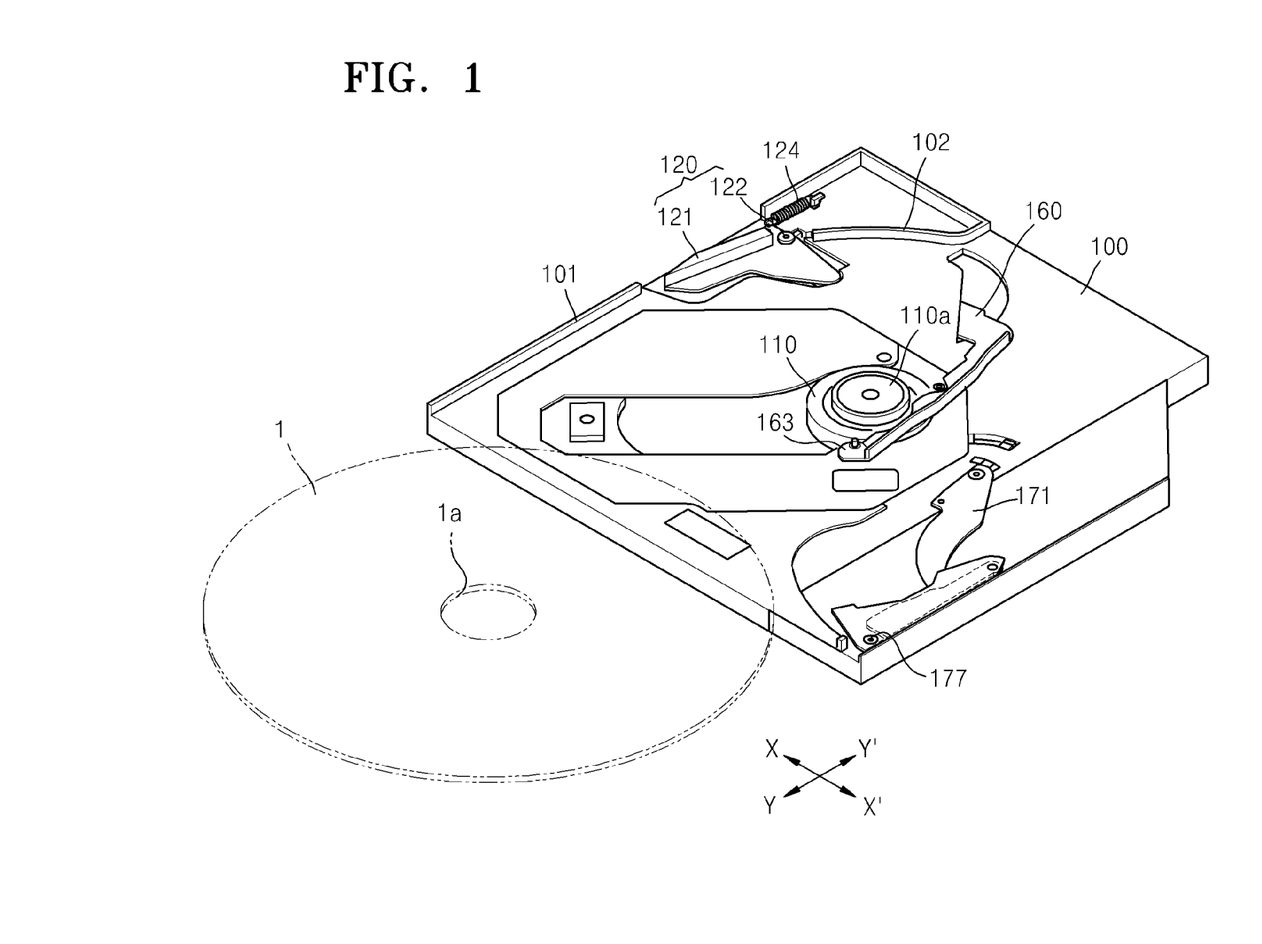
FIG. 1 is a view illustrating an example of an optical disc drive including a disc loading apparatus.
Figure 2:
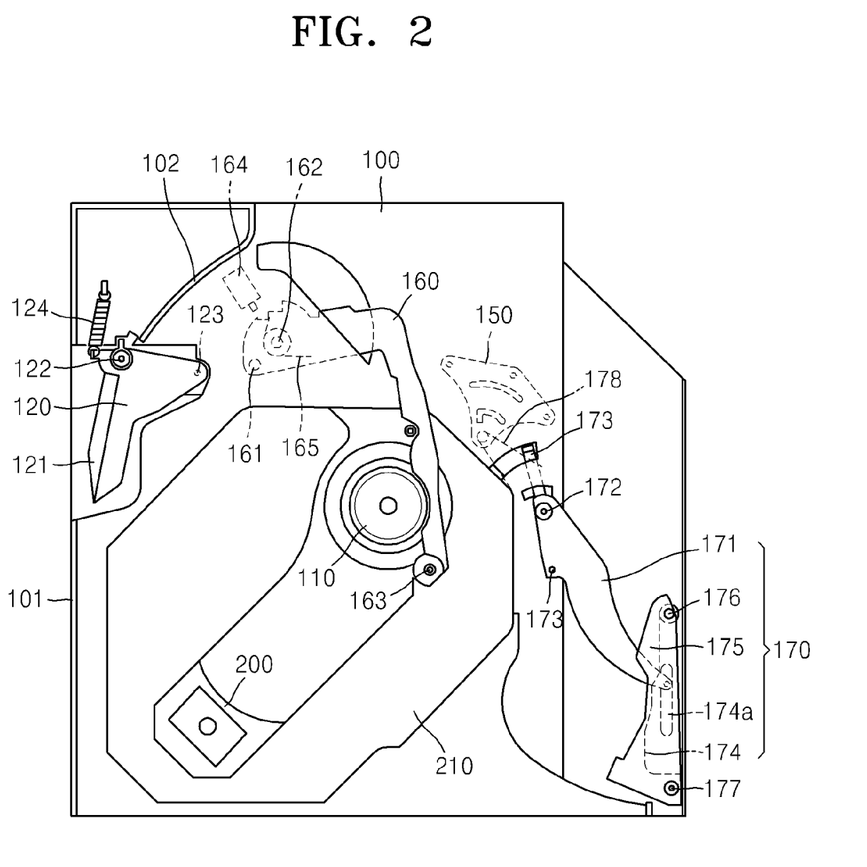
FIG. 2 is a plane view illustrating the example of the optical disc drive shown in FIG. 1.
Figure 3:
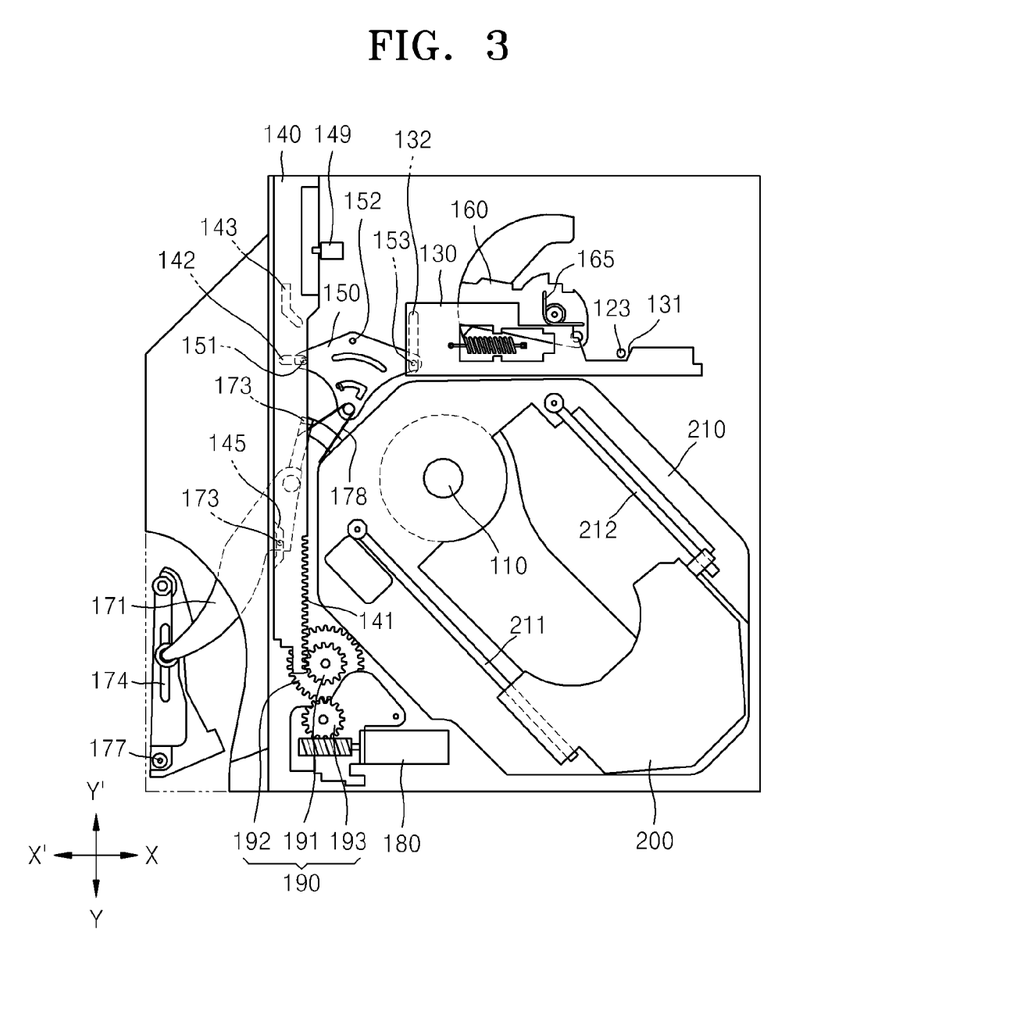
FIG. 3 is a rear view illustrating the example of the optical disc drive shown in FIG. 1.

FIG. 1 illustrates a view of an example of an optical disc drive including a disc loading apparatus. FIG. 2 illustrates a plane view of the example of the optical disc drive shown in FIG. 1. FIG. 3 illustrates a rear view of the example of the optical disc drive shown in FIG. 1.

Referring to FIGS. 1 and 2, a spindle motor 110 is disposed in the middle of a frame base 100. The spindle motor 110 may include a spindle 110a on which a center hole 1a of a removable disc 1 may be mounted. A guide wall for guiding the disc 1 may be disposed at one side of the frame base 100. The guide wall includes a linear guide wall 101 and a curved guide wall 102. The linear guide wall 101 may be disposed parallel to a same direction at which the disc 1 enters the optical disc drive, and the curved guide wall 102 may correspond with an edge of the disc 1. A rotational disc centering lever 120 may be configured to center the disc 1 with respect to the spindle motor 110 and may be disposed between the linear guide wall 101 and the curved guide wall 102. The linear guide wall 101 and the curved guide wall 102 may be fixed to the frame base 100. The disc centering lever 120 may include an operating wall 121, a rotating shaft 122, and a guide pin 123 interacting with a sub-slider 130 (see FIG. 3). The operating wall 121 may be disposed in an extending direction of the linear guide wall 101 and capable of being attached to and detached from the edge of the disc 1. The rotating shaft 122 may be rotationally coupled to the frame base 100. The sub-slider 130 may be interlocked with a main slider 140 (see FIG. 3) via a rotational link lever 150. Elements of an interlocking structure for operating the disc centering lever 120, a loading lever structure, and an ejecting lever may include the main slider 140, the sub-slider 130, and the rotational link lever 150.

The disc centering lever 120 may be biased by an extension spring 124 in a direction away from the spindle motor 110. An ejecting lever 160 configured to eject the loaded disc 1 may be disposed at a rear side of the spindle motor 110. The ejecting lever 160 may include an ejecting member 163, a rotating shaft 162, and an interlocking pin 161. The ejecting member 163 may contact the edge of the disc 1. The rotating shaft 162 may be coupled to the frame base 100. The interlocking pin 161 may interlock the rotating shaft 162 with the sub-slider 130. The ejecting lever 160 may be biased by a torsion spring 165 disposed in the rotating shaft 162 in a direction away from the disc 1.

In the frame base 100, a loading lever structure 170 may be disposed on the opposite side of the linear guide wall 101 (on the right in FIGS. 1 and 2). The loading lever structure 170 may include a first loading lever 171 and a second loading lever 175. The first loading lever 171 may interact with the main slider 140 (see FIG. 3), and the second loading lever 175 may interlock with the first loading lever 171. The first loading lever 171 and the second loading lever 175 may include rotating shafts 172 and 176, respectively. The first loading lever 171 and the second loading lever 175 may be rotationally coupled to the frame base 100. In this example, the first loading lever 171 may be biased clockwise by a spring 178. A rear end portion 173 disposed at a rear side of the first loading lever 171 may interact with a cam groove 145 (see FIG. 3). The cam groove 145 may be disposed in the main slider 140. A loading member 177 may contact the edge of the disc 1, and the loading member 177 may be disposed at an end of the second loading lever 175. One end of the first loading lever 171 may be coupled to a cam structure 174a. The cam structure 174a may be interposed between the rotating shaft 176 and the loading member 177 of the second loading lever 175. The cam structure 174a may be formed in a cam member 174, the cam member 174 being integrally coupled with the second loading lever 175. Accordingly, in response to the main slider 140 being operated by a loading motor 180, the first and second loading levers 171 and 175 may rotate in the same direction.

The spindle motor 110, an optical pick-up apparatus 200, and guide shafts 211 and 212 supporting the operation of the optical pick-up apparatus 200 may be installed in a sub-frame 210. One end of the sub-frame 210 may be rotationally hinge-coupled to the frame base 100, similar to a conventional disc drive. The other end of the sub-frame 210 may interact with the main slider 140 and the sub-slider 130, and the other end of the sub-frame 210 may be configured to move up and down in a direction orthogonal to a plane of the frame base 100.

Referring to FIG. 3, a spur gear 141 may be formed on one side of the main slider 140. A gear apparatus 190 may be disposed at the one side of the main slider 140 and may include a plurality of gears 191, 192, and 193. The gear apparatus 190 may transmit power supplied from the loading motor 180 to the main slider 140. The loading motor 180 may be disposed at the one side of the gear apparatus 190. The operation of the main slider 140 may interlock the rotational link lever 150 with the first loading lever 171. A cam structure may perform the interlocking between the main slider 140, the rotational link lever 150, and the second loading lever 175, as in a conventional disc drive. The cam structure may include a cam groove and a guide pin.

The rotational link lever 150 may include first, second, and third guide pins 151, 152, and 153 and a cam groove 132 of the sub-slider 130. The first, second, and third guide pins 151, 152, and 153 may be coupled to cam grooves 142 and 143 of the main slider 140. The first and second guide pins 151 and 152 may be coupled to the cam grooves 142 and 143 of the main slider 140, and the third guide pin 153 may be coupled to the cam groove 132 formed in the sub-slider 130. Thus, the sub-slider 130 may reciprocate in an X-X' direction in response to a reciprocating motion in a Y-Y' direction of the main slider 140 when the loading motor 180 operates the main slider 140. The operation of the sub-slider 130 may interlock the disc centering lever 120 and the ejecting lever 160 with each other.

The cam structure 131 of the sub-slider 130 may rotate the guide pin 123 of the disc centering lever 120. The sub-slider 130 may be installed on a bottom surface of the frame base 100 to reciprocate, and the sub-slider 130 may move in an X'-X direction crossing perpendicular to a direction in which the disc 1 enters the optical disc drive (Y-Y' direction).

Hereinafter, loading and unloading processes of the disc 1 will be described with reference to FIGS. 4 to 10.

Figure 4:
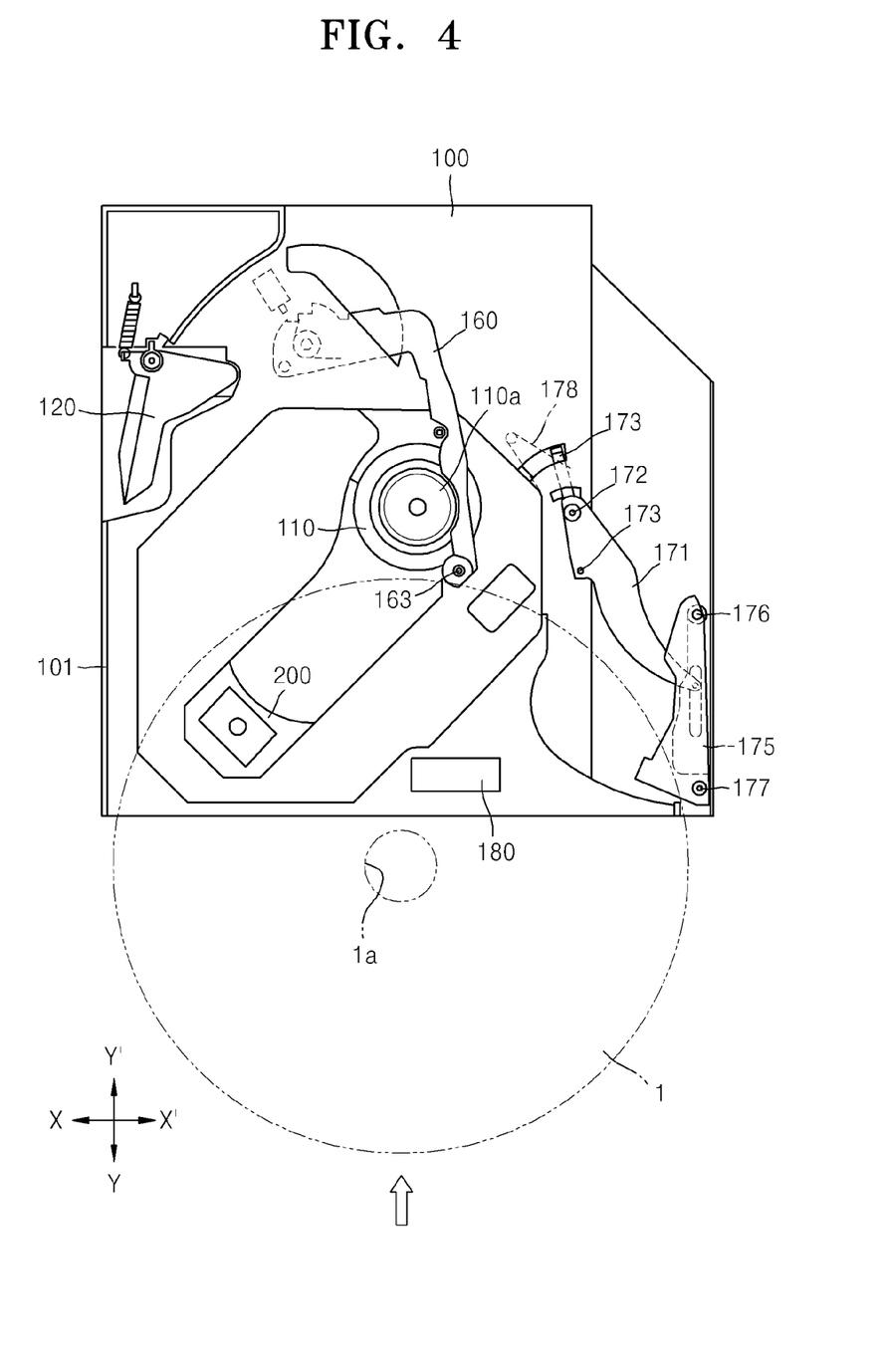
FIGS. 4 to 10 are views illustrating states of an optical disc drive during loading and unloading of a disc.
Figure 5:
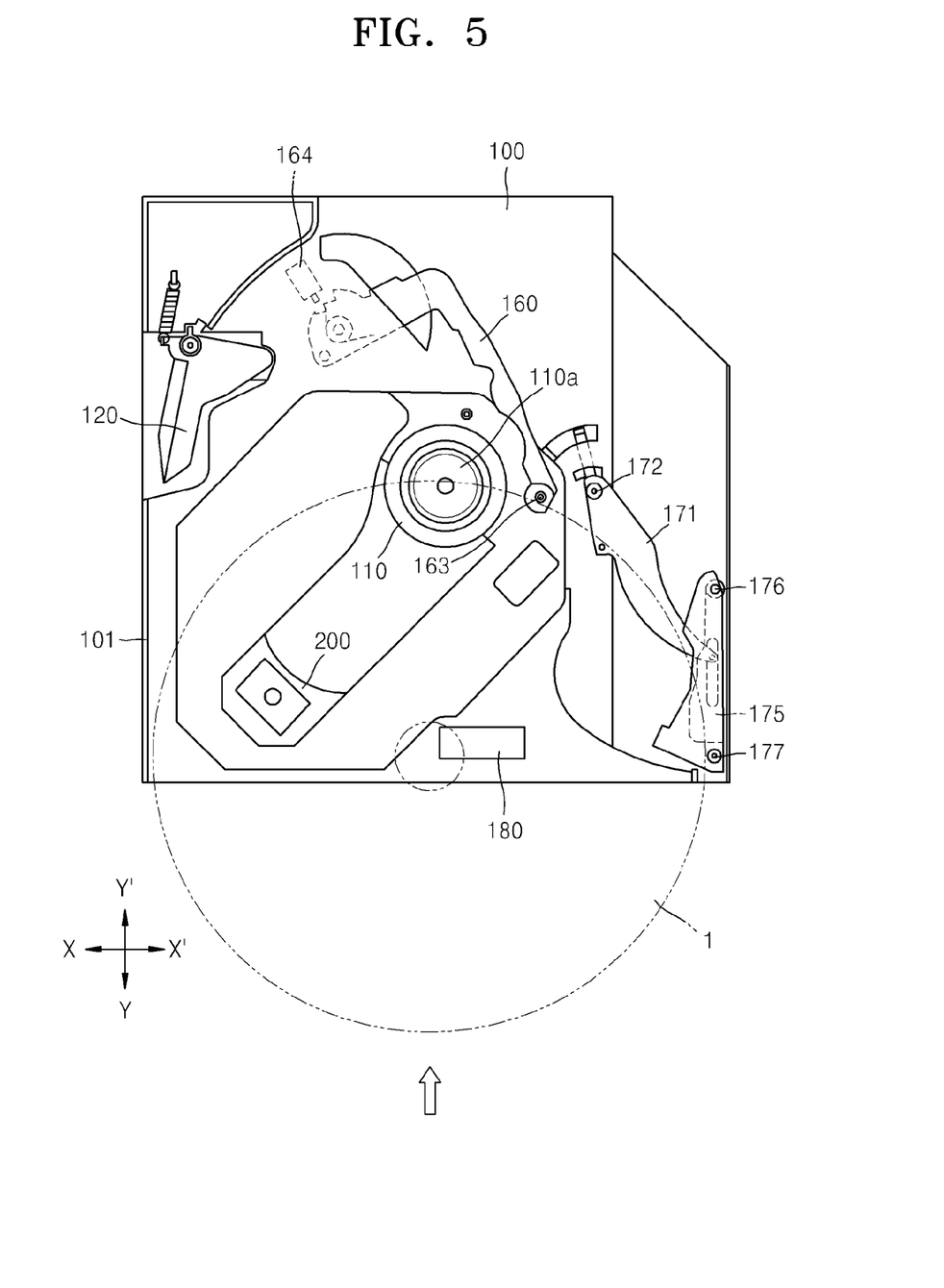

FIG. 4 illustrates the disc 1 and elements of the disc loading apparatus before the disc 1 enters the optical disc drive. The disc centering lever 120 may be biased clockwise, and the ejecting lever 160 may be rotated to a substantially maximum extent clockwise. Thus the ejecting member 163 may be located near the spindle motor 110. The second loading lever 175 may be rotated counterclockwise to be located away from the spindle motor 110. In this state, in response to the disc 1 being inserted into the optical disc drive, the disc 1 may interact with the ejecting member 163 of the ejecting lever 160 while entering along the guide wall 101 formed at one side of the frame base 100 as shown in FIG. 5. Thus, the entering disc 1 may move the ejecting member 163 in a counterclockwise direction.

Figure 6:
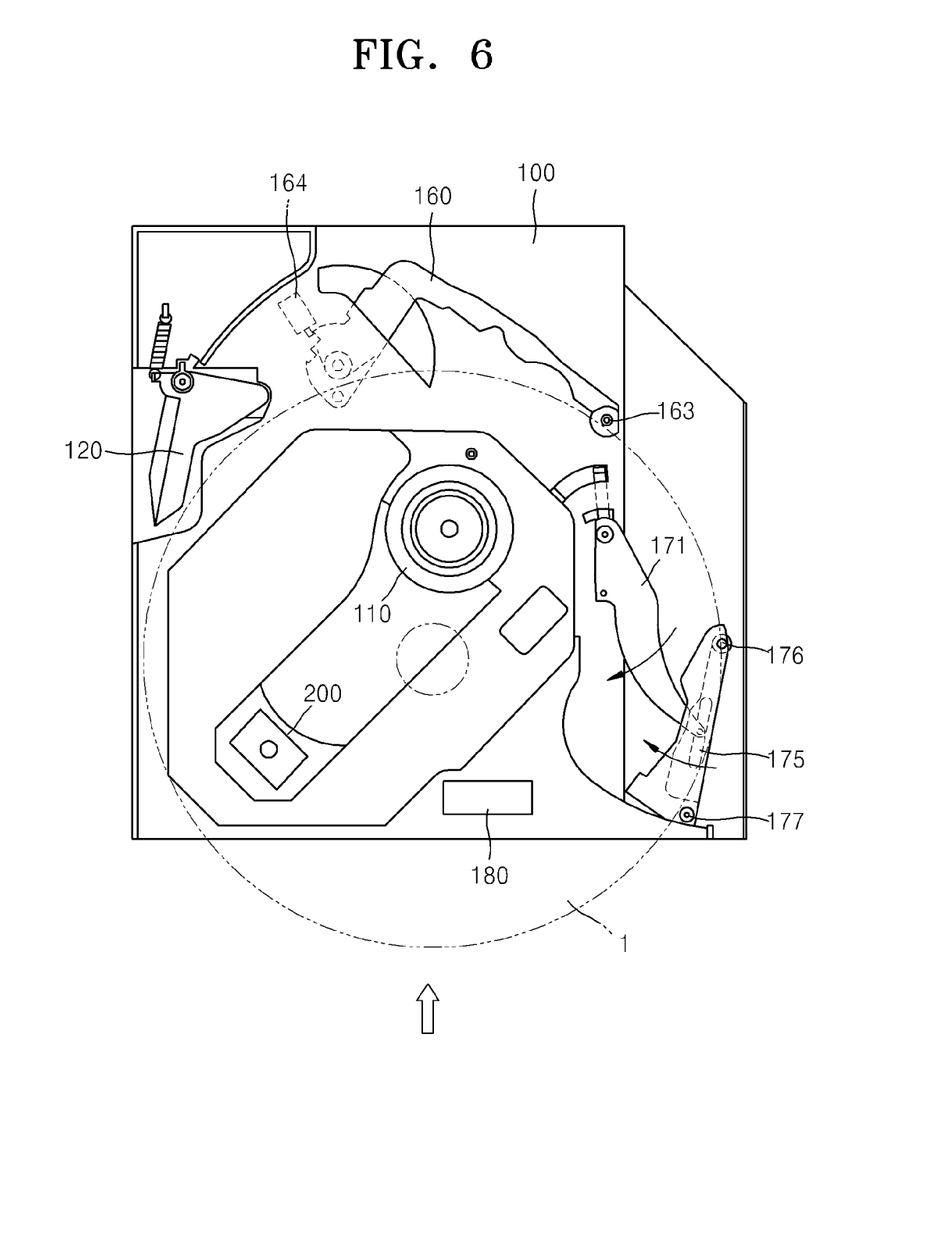
Figure 7:
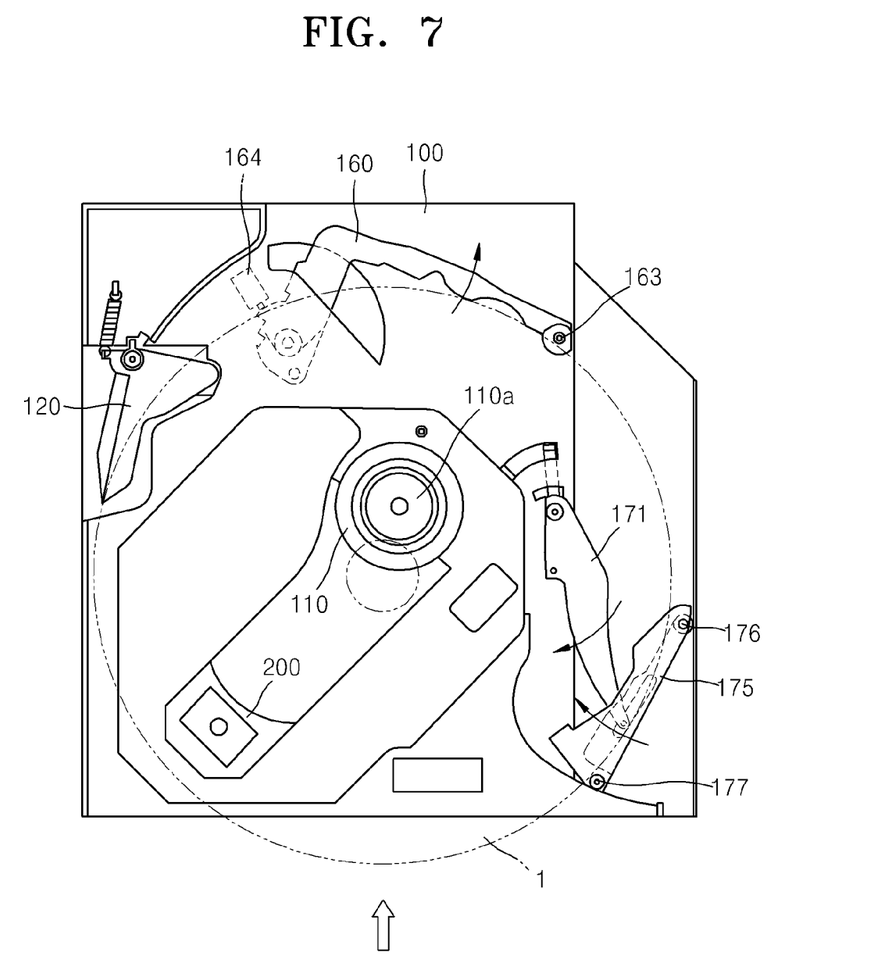
Figure 8:
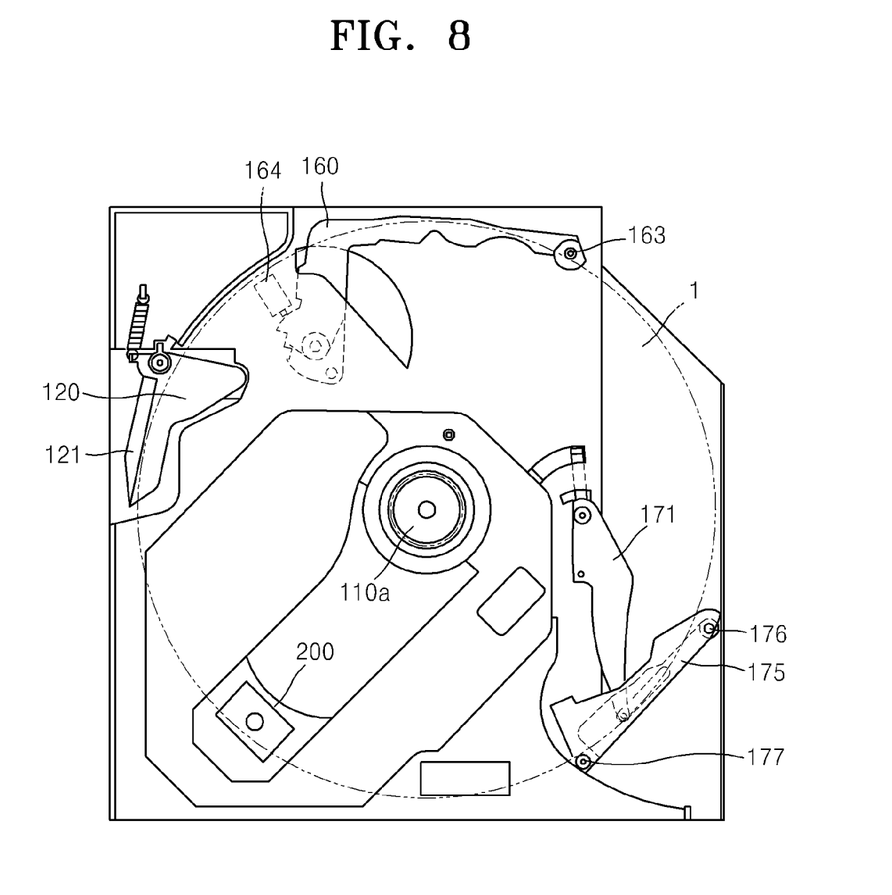
Figure 9:
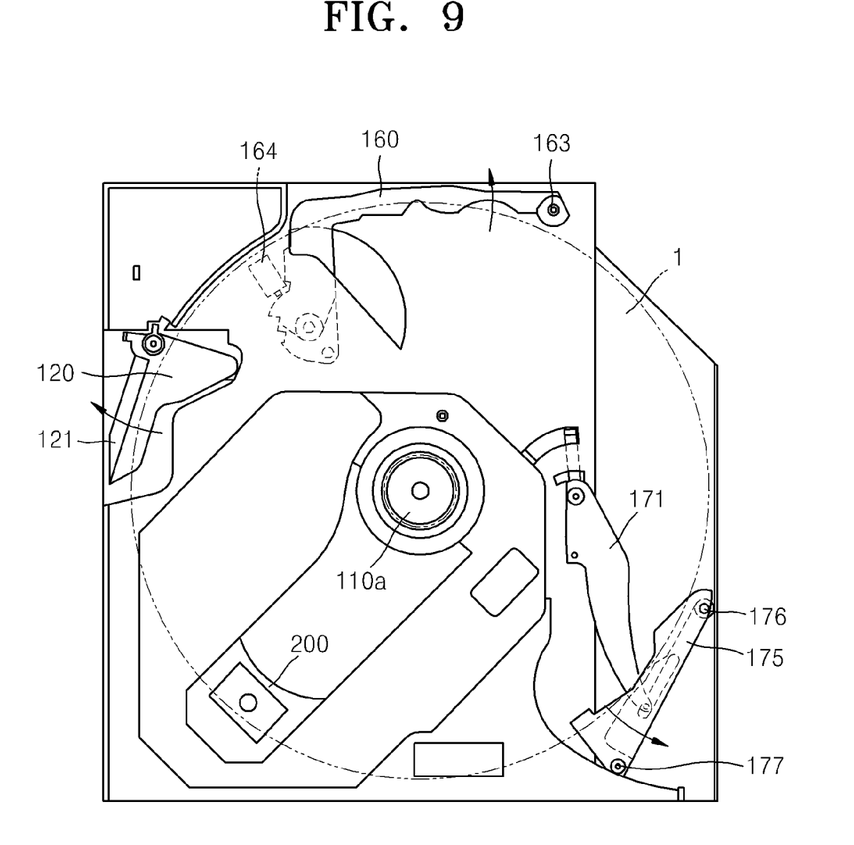

As shown in FIG. 6, in response to the disc 1 further entering the optical disc drive, a switch 164 located near the rotating shaft 162 of the ejecting lever 160 may be operated. The switch 164 may operate the main slider 140 by activating the loading motor 180, and the entering disc may activate the loading lever structure 170. In response to the first loading lever 171 directly interlocked with the main slider 140 rotating clockwise, the second loading lever 175 interlocked with the first loading lever 171 may rotate clockwise. Accordingly, as shown in FIG. 7, the first loading lever 175 loads the disc 1 into the optical disc drive without additional aid from another device, and thus, the disc 1 is centered with respect to the spindle motor 110, as shown in FIG. 8. In this regard, the center hole 1a of the disc 1 inserted into the optical disc drive in combination with the guide wall 121 of the disc centering lever 120 and the first loading lever 175 of the ejecting lever 160 is located on top of the spindle 110a. A switch 149 may detect whether the disc 1 is centered, similar to a conventional disc drive (see FIG. 3). The switch 149 may be operated by the slider 140. As shown in FIG. 9, after the centering of the disc 1 is confirmed, the spindle motor 110 may move upward by the operation of the sub-frame 210, similar to the conventional disc drive, and thus, the center hole 1a of the disc 1 may be inserted into the spindle 110a. As such, after the disc 1 is mounted on the spindle 110a, the centering lever 120, the ejecting lever 160, and the first loading lever 175 may separate the guide wall 121, the ejecting member 163, and the loading member 177 from the edge of the disc 1, and thus, the disc 1 may be free to be rotated by the spindle motor 110. In this regard, the guide wall 121, the ejecting member 163, and the loading member 177 may be separated from the edge of the disc 1. The separation may occur by operating the centering lever 120, the ejecting lever 160, and the second loading lever 175 using the main slider 140 and the sub-slider 130. The main slider 140 and the sub-slider 130 may be operated by the loading motor 180.

Figure 10:
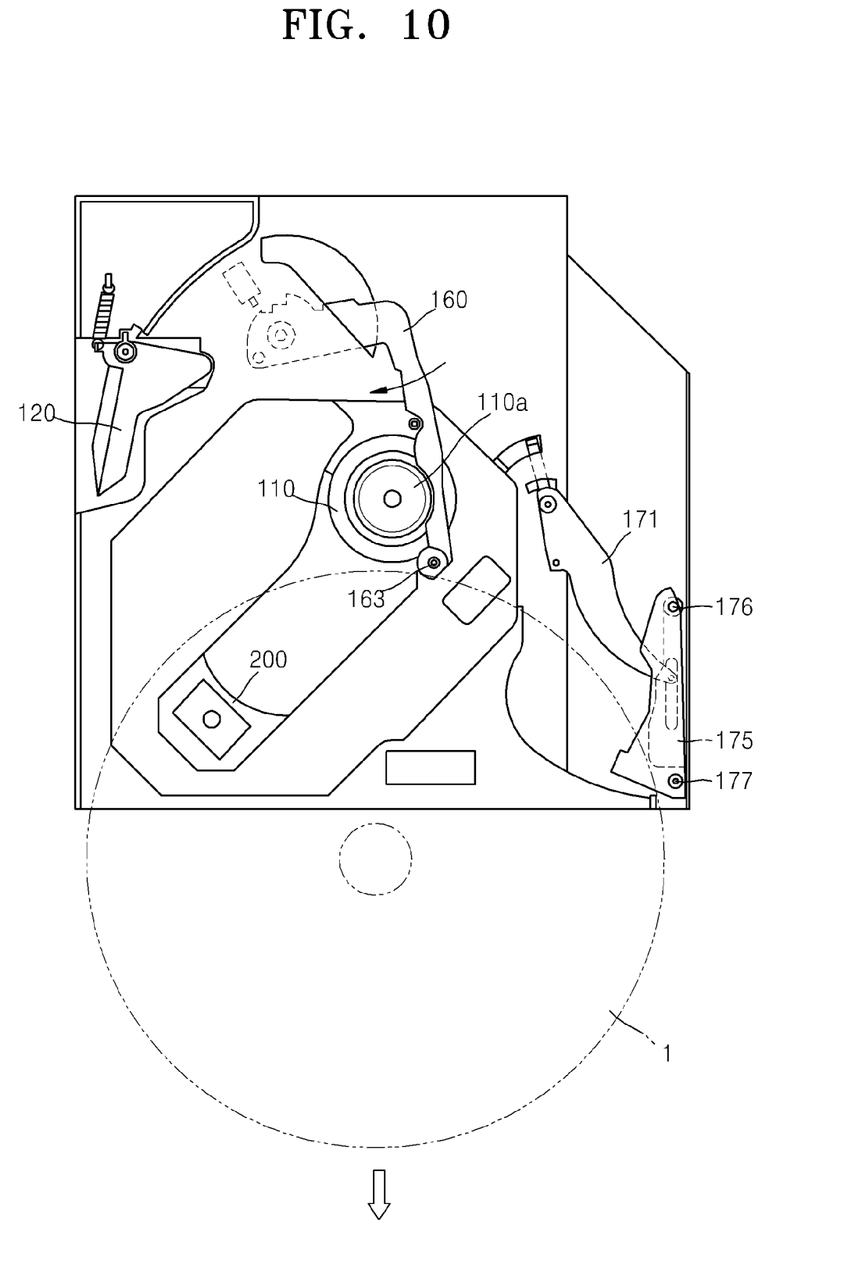

The unloading of the disc 1 may be performed by reversing the order of the loading of the disc 1. As shown in FIG. 10, ejection of the disc 1 may be performed by rotating the ejecting lever 160 that is operated by the loading motor 180. In response to the disc 1 being unloaded, the disc 1 may be separated from the spindle motor 110, and then the ejecting lever 160 ejects the disc, similar to a conventional disc drive.

In the above-described example, although a connection structure exists between a main slider, a sub-slider, a centering lever, an ejecting lever, and a loading lever, the connection structure has not been described in detail. The main slider, the sub-slider, the centering lever, the ejecting lever, and the loading lever are interlocked with one another and are the main elements in a structure in which power is supplied by the loading motor 180. Any structure capable of obtaining the above-described operations may be applied.

The above description relates to a disc guide structure that includes a fixed guide wall formed in a frame base and a centering lever installed to rotate with respect to the fixed guide wall. A disc loading apparatus is designed to be used only for a disc having one size, for example, a diameter of 12 cm. Thus, the disc loading apparatus has a simpler structure than a conventional disc having various sizes, thereby reducing manufacturing cost.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc loading apparatus comprising:
a frame base;
a spindle motor installed in the frame base;
a nonmovable, stationary disc guide wall disposed at one side of the frame base and configured to guide a loading of a disc;
a disc loading structure disposed in front of another side of the frame base and disposed parallel to a direction in which the disc enters to load the disc on the spindle motor;
a rotational disc centering lever disposed adjacent to the guide wall and configured to center the disc with respect to the spindle motor; and
an ejecting lever disposed at a rear side of the frame base and configured to unload the disc loaded on the spindle motor.

2. The disc loading apparatus of claim 1, wherein the disc guide wall comprises a linear guide wall disposed parallel to a direction in which the disc enters and a curved guide wall corresponding to an edge of the disc.

3. The disc loading apparatus of claim 2, wherein the disc centering lever is disposed between the linear guide wall and the curved guide wall.

4. The disc loading apparatus of claim 3, wherein the disc centering lever comprises a rotating shaft coupled to the frame base and an operating wall capable of being attached to and detached from the edge of the disc.

5. The disc loading apparatus of claim 1, wherein the disc centering lever comprises a rotating shaft coupled to the frame base and an operating wall capable of being attached to and detached from the edge of the disc.

6. The disc loading apparatus of claim 5, wherein the disc loading structure comprises first and second loading levers configured to be interlocked with each other.

7. The disc loading apparatus of claim 6, wherein the second loading lever includes a loading member configured to contact the edge of the disc.

8. The disc loading apparatus of claim 6, wherein the first and second loading levers are rotationally coupled to the frame base.

9. The disc loading apparatus of claim 1, wherein the disc loading structure comprises first and second loading levers configured to be interlocked with each other.

10. An optical disc drive comprising:
a frame base;
a sub-frame rotationally disposed in a direction orthogonal to a plane of the frame base;
a spindle motor installed in the sub-frame;
an optical pick-up apparatus disposed at one side of the spindle motor on the sub-frame;
a nonmovable, stationary disc guide wall disposed at one side of the frame base and disposed parallel to a direction in which a disc enters;

a disc loading structure disposed at another side of the frame base and disposed parallel to the direction in which the disc enters to load the disc on the spindle motor;

a rotational disc centering lever disposed at a rear side of the guide wall and configured to center the disc with respect to the spindle motor; and an ejecting lever disposed at a rear side of the frame base and configured to unload the disc loaded on the spindle motor.

11. The optical disc drive of claim 10, wherein the disc guide wall comprises a linear guide wall disposed parallel to a direction in which the disc enters and a curved guide wall corresponding to an edge of the disc.

12. The optical disc drive of claim 10, wherein the disc centering lever is disposed between a linear guide wall and a curved guide wall.

13. The optical disc drive of claim 12, wherein the disc centering lever comprises a rotating shaft coupled to the frame base and an operating wall capable of being attached to and detached from the edge of the disc.

14. The optical disc drive of claim 13, wherein the disc loading structure comprises:

a loading motor;

a first loading lever operating with respect to the loading motor; and a second loading lever capable of being interlocked with the first loading lever, a loading member that contacts the disc being disposed at an end of the second loading lever.

15. The optical disc drive of claim 14, wherein one end of the first loading lever is coupled to a cam structure disposed between a rotating shaft coupled to the frame base of the second loading lever and the loading member.

16. An optical disc apparatus comprising:

a frame base;

a sub-frame rotationally disposed in a direction orthogonal to a plane of the frame base;

a spindle motor installed in the sub-frame;

an optical pick-up apparatus disposed at one side of the spindle motor on the sub-frame;

a nonmovable, stationary disc guide wall disposed at one side of the frame base;

a disc loading structure disposed at another side of the frame base;

a rotational disc centering lever disposed adjacent to the disc guide wall and configured to center a disc with respect to the spindle motor;

an ejecting lever configured to unload the disc loaded on the spindle motor at a rear side of the frame base;

a loading motor configured to operate the rotational disc centering lever and the ejecting lever; and an interlocking structure configured to transmit power supplied from the loading motor to the rotational disc centering lever and the ejecting lever.

17. The optical disc apparatus of claim 16, wherein the interlocking structure comprises:

a gear apparatus connected to the loading motor;

a main slider interlocked with the gear apparatus configured to operate the disc loading structure; and a sub-slider operated by the main slider and configured to operate the ejecting lever.

18. The optical disc apparatus of claim 17, wherein the disc guide wall comprises a linear guide wall disposed parallel to a direction in which the disc enters and a curved guide wall corresponding to an edge of the disc.

19. The optical disc apparatus of claim 18, wherein the disc centering lever is disposed between the linear guide wall and the curved guide wall.

20. The optical disc apparatus of claim 16, wherein the disc centering lever comprises a rotating shaft coupled to the frame base and an operating wall capable of being attached to and detached from the edge of the disc.

* * * * *